R. V. HASTINGS.
TIRE PROTECTOR.
APPLICATION FILED OCT. 7, 1912.
1,073,118.
Patented Sept. 16, 1913.
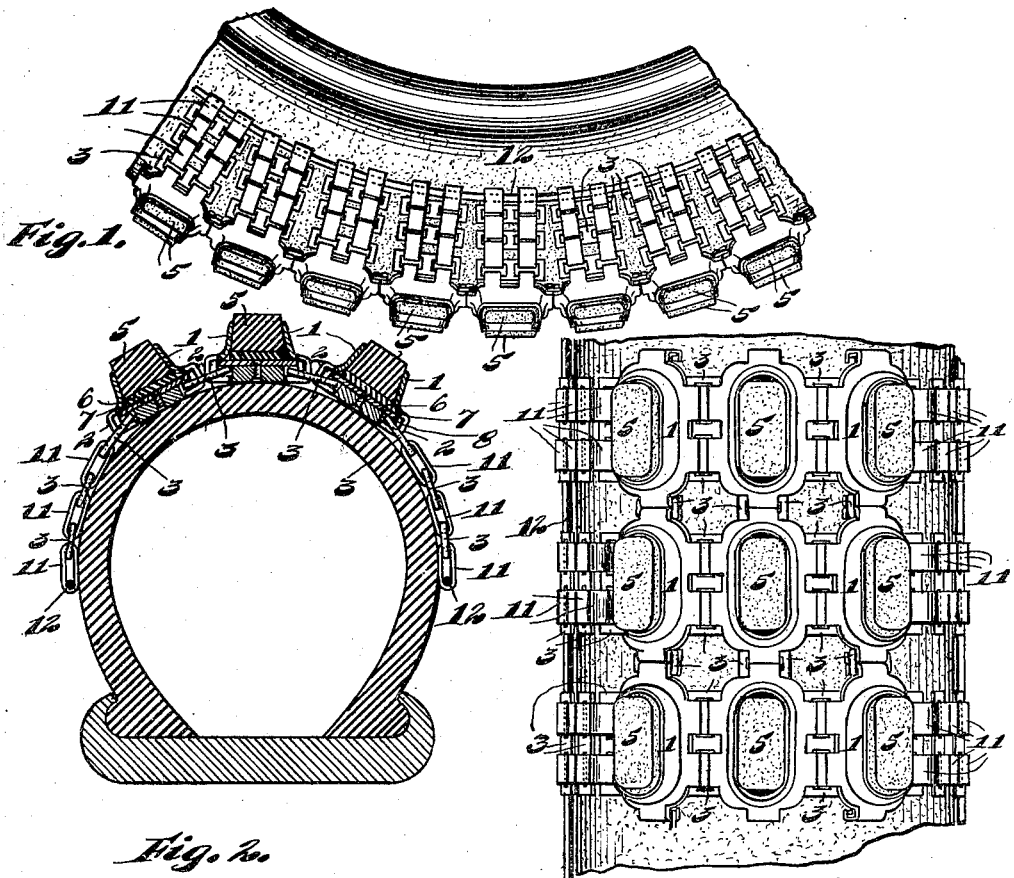
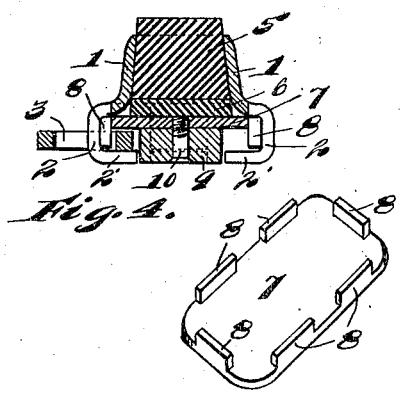
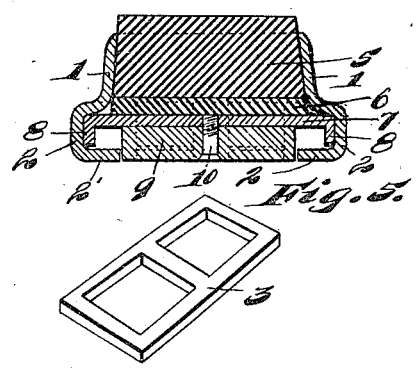
Witnesses:
E. E. Wessels.
B. J. Richards.
Inventor:
Ralph V. Hastings,
By Joshua R. H. Potts
his Attorney.

UNITED STATES PATENT OFFICE.

RALPH V. HASTINGS, OF CHICAGO, ILLINOIS.

TIRE-PROTECTOR.

1,073,118. Specification of Letters Patent. Patented Sept. 16, 1913.

Application filed October 7, 1912. Serial No. 724,322.

*To all whom it may concern:*

Be it known that I, RALPH V. HASTINGS, a citizen of the United States, and a resident of the city of Chicago, county of Cook, and State of Illinois, have invented certain new and useful Improvements in Tire-Protectors, of which the following is a specification.

My invention relates to improvements in tire protectors and has for its object the provision of an improved device of this character which is of simple construction and efficient in use.

The invention consists in the combinations and arrangements of parts hereinafter fully described and claimed.

The invention will be best understood by reference to the accompanying drawings forming a part of this specification, and in which—

Figure 1 is a side elevation of a portion of an automobile wheel equipped with a tire protector embodying my invention, Fig. 2 is an enlarged section through a tire and protector, Fig. 3 is a plan view corresponding with Fig. 2. Fig. 4 is a transverse section through one of the tread members employed in the construction, Fig. 5 is a longitudinal section of one of said tread members, Fig. 6 is a perspective view of a reinforcing member employed in the construction, and Fig. 7 is a perspective view of one of the securing links employed in the construction.

The preferred form of construction as illustrated in the drawings comprises a plurality of outwardly tapering metallic socket members 1 having securing hooks 2 at their ends and sides and adapted to engage links 3 and 4, as shown. Outwardly tapering rubber blocks 5 are inserted in each of the socket members 1 and are provided with reinforcing canvas bases 6 vulcanized thereto. A reinforcing plate 7 is inserted between hooks 2 and is provided with a plurality of projections 8 adapted to fit within said hooks as shown. Rubber tread block 5 and reinforcing plate 7 are inserted in position before the hooks are completed, the outer ends 2' of said hooks being bent down over projections 8 after said tread block and reinforcing plate are placed in position, as indicated in Figs. 4 and 5. Tread blocks 9 are inserted between hooks 2 and secured in position by means of screws 10 to furnish a smooth bearing surface for the tire and to positively lock links 3 and 4 in position. By this arrangement it will be observed that the outward or bursting strains on links 3 and 4 will be transmitted primarily to projections 8 and thence to reinforcing plate 7 to reinforce hooks 2 and socket member 3 against breaking under strain.

In use a plurality of socket members 1 are secured together at their sides by means of links 3 and a plurality of links 3 are secured to the outermost of said socket members by means of links 11 to form a band adapted to partially encompass the tire. The outermost links 11 are secured to holding wires 12, as indicated, said holding wires serving to retain the parts in position. Each of these bands is connected with an adjacent band by means of links 4 engaging the end hooks on adjacent socket members, to form a protector adapted to encompass a tire or tread portion of the tire. The protector is applied on the tire when in deflated or partially deflated condition and will be securely held in position when said tire is inflated, as will be readily understood by those skilled in the art.

The construction set forth will be found to be strong, durable and highly efficient in use.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A tread member for tire protectors comprising a body provided with hooks for securing it in position; and a reinforcing member having projections extending within said hooks and adapted to engage members engaging said hooks and relieve said body from strain, substantially as described.

2. A tread member for tire protectors comprising a socket member open at both its inner and outer sides and provided with securing hooks; a tread block removably inserted in said socket from the inside; and a reinforcing plate closing the inner end of said socket member and provided with projections extending within said hooks and adapted to engage members engaging said hooks and relieve said socket member from strain, substantially as described.

3. A tread member for tire protectors comprising an outwardly tapering metallic socket member having securing hooks at its ends and sides; a rubber tread block removably inserted in said socket from the inside thereof; a reinforcing plate closing the inner end of said socket member and provided with projections extending within said hooks and adapted to engage members engaging said hooks and relieve said socket member from strain; and a tire-bearing plate inserted between said hooks and removably secured to said reinforcing plate, substantially as described.

In testimony whereof I have signed my name to this specification in the presence of two subscribing witnesses.

RALPH V. HASTINGS.

Witnesses:
  JOSHUA R. H. POTTS,
  B. G. RICHARD.

Copies of this patent may be obtained for five cents each, by addressing the "Commissioner of Patents, Washington, D. C."